(12) United States Patent
Huang

(10) Patent No.: US 10,465,100 B2
(45) Date of Patent: Nov. 5, 2019

(54) SEALANT COMPOSITION AND APPLICATION THEREOF

(71) Applicant: BOE Technology Group Co., Ltd., Beijing (CN)

(72) Inventor: Hua Huang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 29 days.

(21) Appl. No.: 15/534,361

(22) PCT Filed: Nov. 18, 2016

(86) PCT No.: PCT/CN2016/106395
§ 371 (c)(1),
(2) Date: Jun. 8, 2017

(87) PCT Pub. No.: WO2017/118226
PCT Pub. Date: Jul. 13, 2017

(65) Prior Publication Data
US 2018/0105725 A1    Apr. 19, 2018

(30) Foreign Application Priority Data

Jan. 4, 2016  (CN) .......................... 2016 1 0004497

(51) Int. Cl.
*C09J 11/04*     (2006.01)
*C08K 7/04*     (2006.01)
(Continued)

(52) U.S. Cl.
CPC ............. *C09J 11/04* (2013.01); *C09J 133/12* (2013.01); *G02F 1/1339* (2013.01); *C08K 7/04* (2013.01);
(Continued)

(58) Field of Classification Search
CPC .... C09J 11/04; C09J 133/12; C09J 2205/102; C09J 2203/318; G02F 1/1339; C08K 7/04
See application file for complete search history.

(56) References Cited

FOREIGN PATENT DOCUMENTS

| CN | 101571650 A | 11/2009 |
|----|-------------|---------|
| CN | 102516916 A | 6/2012 |

(Continued)

OTHER PUBLICATIONS

Wang et al., machine English translation of CN 103525316 (Year: 2014).*

(Continued)

*Primary Examiner* — Jessica M Roswell
(74) *Attorney, Agent, or Firm* — Banner & Witcoff, Ltd.

(57) ABSTRACT

A sealant composition includes: a main component; and a high strength fiber with a specific surface area of about 2000 $m^2/g$ to about 30000 $m^2/g$, wherein the amount of the high strength fiber is about 0.5% to about 3% based on the weight of the main component. The high strength fiber has a high specific surface area and has active groups such as a hydroxyl group and a carboxyl group on its surface, and allows the fiber resin matrix to form a chemical bond at the interface, thereby improving the reaction ability and bonding strength of the fiber resin matrix, and enhancing the overall strength of the uncured sealant, and mitigating the phenomenon of liquid crystal puncturing.

11 Claims, 2 Drawing Sheets

(51) Int. Cl.
*G02F 1/1339* (2006.01)
*C09J 133/12* (2006.01)
(52) U.S. Cl.
CPC .... *C09J 2203/318* (2013.01); *C09J 2205/102* (2013.01)

(56) References Cited

FOREIGN PATENT DOCUMENTS

| | | |
|---|---|---|
| CN | 202281888 U | 6/2012 |
| CN | 102643393 A | 8/2012 |
| CN | 102775921 A | 11/2012 |
| CN | 103525316 A | 1/2014 |
| CN | 104312477 A | 1/2015 |
| CN | 104312478 A | 1/2015 |
| CN | 104327772 A | 2/2015 |
| CN | 105505264 A | 4/2016 |
| JP | 3162179 B2 | 4/2001 |

OTHER PUBLICATIONS

Machine English translation of CN 104312477 (Year: 2015).*
Machine English translation of CN 104327772 (Year: 2015).*
Machine English translation of CN 105003393 (Year: 2015).*
Mar. 1, 2017—(WO) International Search Report and Written Opinion Appn PCT/CN2016/106395 with English Tran.
Jan. 10, 2017—(CN) First Office Action Appn 201610004497.3 with English Tran.
Jun. 23, 2017—(CN) Second Office Action Appn 201610004497.3 with English Tran.

* cited by examiner

SEALANT COMPOSITION AND APPLICATION THEREOF

The application is a U.S. National Phase Entry of International Application No. PCT/CN2016/106395 filed on Nov. 18, 2016, designating the United States of America and claiming priority to Chinese Patent Application No. 201610004497.3, filed on Jan. 4, 2016. The present application claims priority to and the benefit of the above-identified applications and the above-identified applications are incorporated by reference herein in their entirety.

TECHNICAL FIELD

Embodiments of the present disclosure relate to a field of liquid crystal display, especially relate to a sealant composition and a manufacturing method thereof.

BACKGROUND

A sealant is an adhesive which is configured for bonding two glasses of a liquid crystal cell, and sealing the liquid crystal in the liquid crystal cell, and also preventing the external pollutant from entering.

The existing sealant generally comprises Acrylic, a resin, inorganic silicon particles and a photoinitiator. In the process of manufacturing a liquid crystal cell, because of the impact of liquid crystal on the sealant during assembling the cell, liquid crystal tends to puncture the sealant, which may lead to leakage of the liquid crystal. Especially, with the development of market and customers, a narrow frame display becomes more and more desirable. When a width of the sealant is less than or equal to 0.4 cm, it is very difficult to control the material and process of the sealant, and thus liquid crystal is very easy to puncture the sealant. FIG. 1 is a schematic diagram of puncturing of a liquid crystal cell. In FIG. 1, 1 refers to liquid crystal; 2 refers to a glass plate of a liquid crystal cell; 3 refers to a sealant. As illustrated in FIG. 1, the liquid crystal is easy to puncture the sealant, which leads to leakage of the liquid crystal.

SUMMARY

At least one embodiment of the present disclosure provides a sealant composition and an application thereof. The sealant composition has high strength, and the phenomenon of liquid crystal puncturing can be effectively mitigated. The sealant composition comprises a main component, and a high strength fiber with a specific surface area of about 2000 $m^2/g$ to about 30000 $m^2/g$; wherein the amount of the high strength fiber is about 0.5% to about 3% based on the weight of the main component.

For example, the high strength fiber has a modulus of greater than about 200 g/denier.

For example, the high strength fiber is a carbon fiber.

For example, the carbon fiber has an active group on its surface.

For example, the specific surface area of the high strength fiber is from about 8000 $m^2/g$ to about 13500 $m^2/g$.

For example, the carbon fiber is manufactured by an electrochemical oxidation method or a chemical grafting modification method.

For example, the electrochemical oxidation method comprises: performing electrolysis in an electrolyte solution by using the carbon fiber as an anode and using nickel or copper plate as a cathode, wherein the electrolyte solution is an organic acid or a salt thereof.

For example, the main component comprises about 70 wt % to about 80 wt % of polymethyl methacrylate; about 10 wt % to about 20 wt % of epoxy resin; about 5 wt % to about 15 wt % of inorganic silicon particles; and about 3 wt % to about 8 wt % of a photoinitiator.

For example, the photoinitiator is one or more selected from α, α-diethoxy acetophenone, α-hydroxyl alkyl phenyl ketone, α-amino alkyl phenyl ketone.

For example, the amount of the high strength fiber is about 2% to about 2.5% based on the weight of the main component.

For example, the main component comprises about 8 wt % to about 12 wt % of inorganic silicon particles.

At least one embodiment of the present disclosure discloses an application of the sealant composition of the above technical solutions in manufacturing a liquid crystal panel.

At least one embodiment of the present disclosure discloses a liquid crystal panel which comprises the sealant composition of the above technical solutions.

Compared with prior art, the sealant composition provided by at least one embodiment of the present disclosure comprises a high strength fiber with a high specific surface area in addition to a main component. The fiber has active groups such as a hydroxyl group and a carboxyl group on its surface, and allows the fiber resin matrix to form a chemical bond at the interface, thereby improving the reaction ability and bonding strength of the fiber resin matrix, and enhancing the overall strength of the uncured sealant, and mitigating the phenomenon of liquid crystal puncturing. The amount of the high strength fiber is about 0.5% to about 3% based on the weight of the main component, which not only ensures the strengthening effect, but also guarantees the adhesion after final curing.

DETAILED DESCRIPTION

Figure 1:
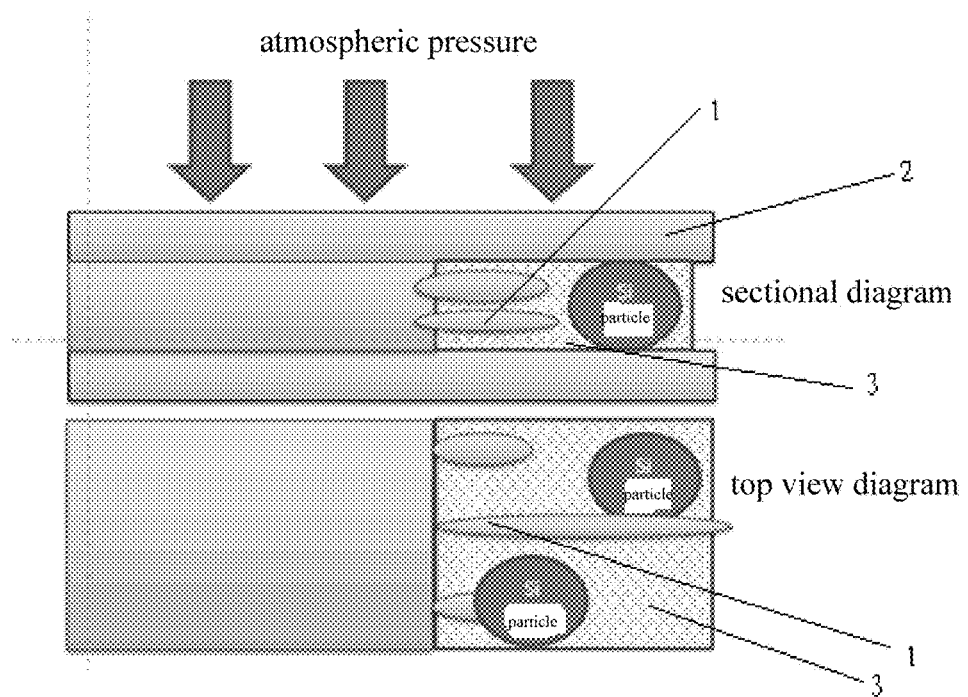
FIG. 1 is a schematic diagram showing puncturing of a liquid crystal cell.

In order to further understand the present disclosure, the preferable technical solutions of the present disclosure will be described in connection with some embodiments. It should be understood that, the descriptions are only to explain the features and advantages of the present disclosure, and thus are not limitative of the present disclosure.

At least one embodiment of the present disclosure discloses a sealant composition which comprises a main component, and a high strength fiber with a specific surface area of about 2000 $m^2/g$ to about 30000 $m^2/g$, wherein the amount of the high strength fiber is about 0.5% to about 3% based on the weight of the main component.

In the embodiment of the present disclosure, improving the strength is achieved by incorporating a material with an enhancing effect into the sealant.

The main component may be selected from the following mixtures, for example, the main component comprises about 70 wt % to about 80 wt % of polymethyl methacrylate; about 10 wt % to about 20 wt % of epoxy resin; about 5 wt % to about 15 wt % of inorganic silicon particles; and about 3 wt % to about 8 wt % of a photoinitiator. Or, the main component comprises for example about 70 wt % to about 80 wt % of polymethyl methacrylate; about 8 wt % to about 12 wt % of epoxy resin; about 5 wt % to about 15 wt % of inorganic silicon particles; and about 3 wt % to about 8 wt % of a photoinitiator. Or, the main component comprises for example about 80 wt % of polymethyl methacrylate; about 10 wt % of epoxy resin; about 5 wt % of inorganic silicon particles; and about 5 wt % of a photoinitiator.

The photoinitiator is one or more selected from of $\alpha, \alpha$-diethoxy acetophenone, $\alpha$-hydroxyl alkyl phenyl ketone and $\alpha$-amino alkyl phenyl ketone.

The above main component can interact well with the high strength fiber.

In the embodiment of the present disclosure, a high strength fiber is added to the main component. The specific surface area of the high strength fiber may be from about 2000 $m^2/g$ to about 30000 $m^2/g$, for example from about 8000 $m^2/g$ to about 13500 $m^2/g$. A modulus of the high strength fiber is for example greater than about 200 g/denier. The high strength fiber is for example a carbon fiber with a specific surface area from about 2000 $m^2/g$ to about 30000 $m^2/g$; the carbon fiber has active groups such as a hydroxyl and a carboxyl on its surface. The carbon fiber with active groups can be obtained by surface treatment, for example, by an electrochemical oxidation method or a chemical grafting modification method. After the surface treatment, the specific surface area of the carbon fiber is increased about 2 to 10 times.

For example, the electrochemical oxidation method comprises: performing electrolysis in an electrolyte solution by using the carbon fiber as an anode and using nickel or copper plate as a cathode, wherein the electrolyte solution is an organic acid or a salt thereof.

There are no restrictions on the specific procedure of the chemical grafting modification method in the present disclosure, and the method is well known to those skilled in the art.

The amount of the high strength fiber may be about 0.5% to about 3% based on the weight of the main component. For example, the amount of the high strength fiber is about 2% to about 2.5% based on the weight of the main component. A desired adhesion strength between the sealant and each of the substrates can be realized by Acrylic (that is polymethyl methacrylate) and epoxy resin in the sealant, whereas a high strength fiber is used for enhancing the internal strength of the sealant. If the amount of the high strength fiber is less than about 0.5% based on the weight of the main component, enhancing the internal strength can not be achieved. If the amount of the high strength fiber is greater than about 3% based on the weight of the main component, the high strength fiber will detract from the adhesion between the upper/lower substrate and the sealant after final curing.

The sealant composition provided by at least one embodiment of the present disclosure comprises a high strength fiber with a high specific surface area in addition to the main component. The fiber has active groups such as a hydroxyl group and a carboxyl group on its surface, and allows the fiber resin matrix to form a chemical bond at the interface, thereby improving the reaction ability and bonding strength of the fiber resin matrix, and enhancing the overall strength of the uncured sealant, and mitigating the phenomenon of liquid crystal puncturing.

Figure 2:
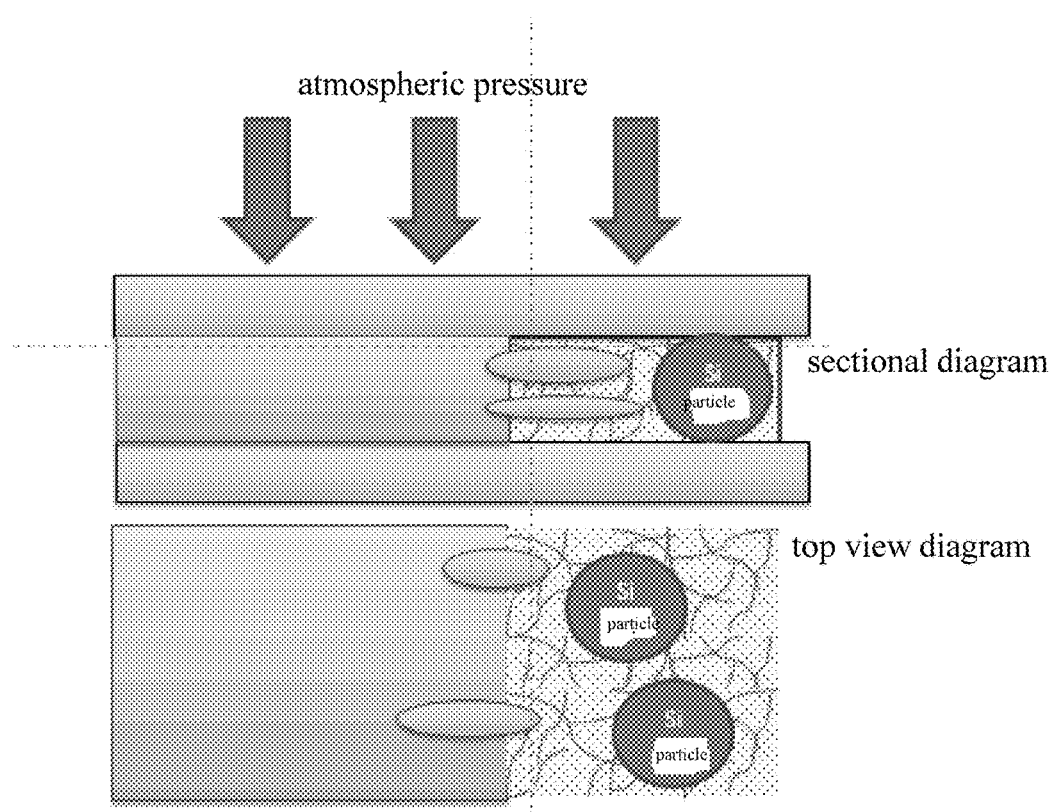
FIG. 2 is a schematic diagram showing a sealant in a liquid crystal cell provided by an embodiment of the present disclosure.

FIG. 2 is a schematic diagram of a sealant in a liquid crystal cell provided by an embodiment of the present disclosure. As illustrated in FIG. 2, the sealant with fiber has mitigated liquid crystal puncturing.

At least one embodiment of the present disclosure discloses an application of the sealant composition of the above technical solutions in manufacturing a liquid crystal panel.

At least one embodiment of the present disclosure discloses a liquid crystal panel which comprises the sealant composition of the above technical solutions.

In order to further understand the present disclosure, the sealant composition and application thereof provided by the present disclosure will be described in connection with the examples. The protection scope of the present disclosure is not limited by the following examples.

The materials used in the following examples are commercially available.

Example 1

A sealant composition comprised a main component; and a carbon fiber with a specific surface area of about 10000 $m^2/g$ after electrochemical treating. The manufacturer of the carbon fiber was ZhongFuShenYing Carbon Fiber Limited Liability Company, and the model of the carbon fiber was SYT45. The modulus of the carbon fiber was about 240 g/denier; the amount of the carbon fiber was about 2.5% based on the weight of the main component. The main component consisted of about 80 wt % of polymethyl methacrylate; about 10 wt % of epoxy resin; about 5 wt % of inorganic silicon particles and about 5 wt % of $\alpha, \alpha$-diethoxy acetophenone.

The sealant composition was applied to seal a liquid crystal cell. After testing, the puncture depth of liquid crystal was less than 0.1 mm.

Figure 3:
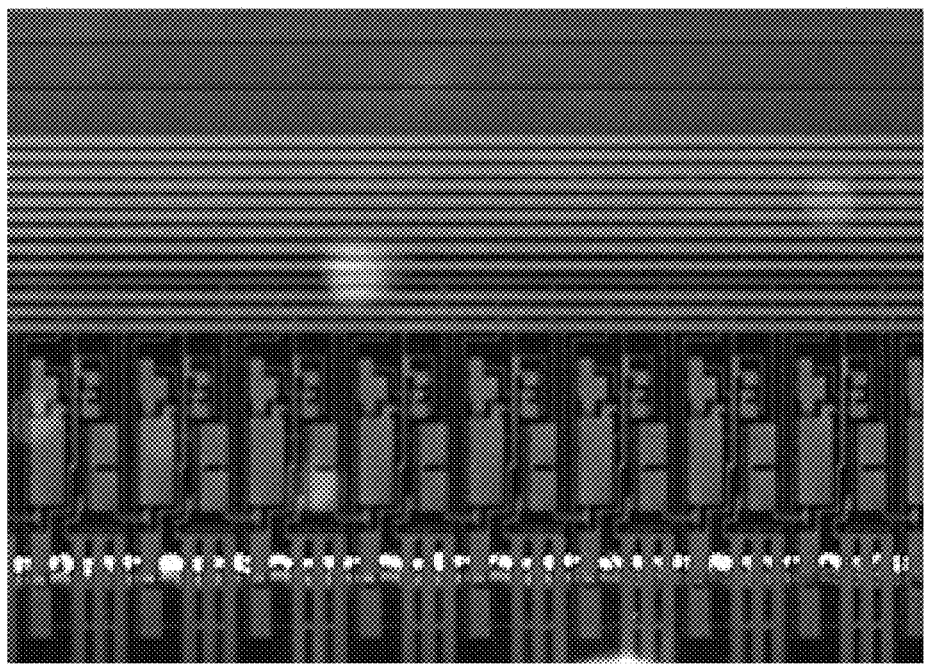
FIG. 3 is a polarizing microscope photograph of a display panel using a sealant composition provided by an embodiment of the present disclosure.

FIG. 3 was a polarizing microscope photograph of a display panel using the sealant composition provided by an embodiment of the present disclosure.

Comparative Example 1

A sealant composition consisted of about 80 wt % of polymethyl methacrylate; about 10 wt % of epoxy resin; about 5 wt % of inorganic silicon particles and about 5 wt % of $\alpha, \alpha$-diethoxy acetophenone.

The sealant composition was applied to seal a liquid crystal cell. After testing, the puncture depth of liquid crystal was greater than 0.2 mm.

Figure 4:
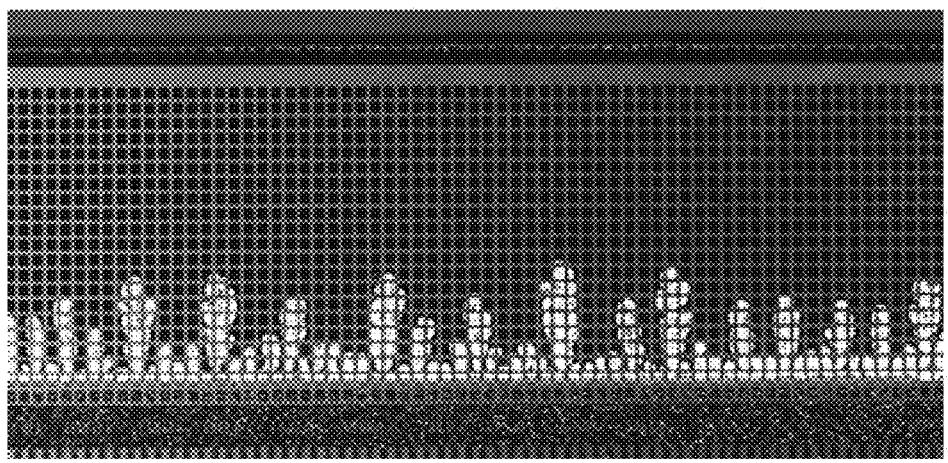
FIG. 4 is a polarizing microscope photograph of a display panel using a sealant composition without a carbon fiber.

FIG. 4 was a polarizing microscope photograph of a display panel using a sealant composition without a carbon fiber.

Example 2

A sealant composition comprised a main component; and a carbon fiber with a specific surface area of about 8000 $m^2/g$ after electrochemical treating. The manufacturer of the carbon fiber was ZhongFuShenYing Carbon Fiber Limited Liability Company, and the model of the carbon fiber was SYT45. The modulus of the carbon fiber was about 240 g/denier; the amount of the carbon fiber was about 2% based on the weight of the main component. The main component consisted of about 80 wt % of polymethyl methacrylate; about 10 wt % of epoxy resin; about 5 wt % of inorganic silicon particles and about 5 wt % of $\alpha, \alpha$-diethoxy acetophenone.

The sealant composition was applied to seal a liquid crystal cell. After testing, the puncture depth of liquid crystal was less than 0.1 mm.

Example 3

A sealant composition comprised a main component; and a carbon fiber with a specific surface area of about 13500 m²/g after electrochemical treating. The manufacturer of the carbon fiber was ZhongFuShenYing Carbon Fiber Limited Liability Company, and the model of the carbon fiber was SYT45. The modulus of the carbon fiber was about 240 g/denier; the amount of the carbon fiber was about 3% based on the weight of the main component. The main component consisted of about 80 wt % of polymethyl methacrylate; about 10 wt % of epoxy resin; about 5 wt % of inorganic silicon particles and about 5 wt % of α, α-diethoxy acetophenone.

The sealant composition was applied to seal a liquid crystal cell. After testing, the puncture depth of liquid crystal was less than 0.1 mm.

The description of the above examples only helps to understand the method and the core idea of the present disclosure. For those skilled in the art, the present disclosure may be improved and modified without departing from the principle of the present disclosure, and such improvement and modification should be within the scope of the disclosure.

What are described above is only related to the illustrative embodiments of the disclosure, and not limitative to the scope of the disclosure. The scope of the disclosure is defined by the accompanying claims.

The application claims priority to the Chinese patent application No. 201610004497.3, filed on Jan. 4, 2016, the entire disclosure of which is incorporated herein by reference as part of the present application.

What is claimed is:

1. A sealant composition, comprising:
   a main component; and
   a high strength fiber with a specific surface area of about 2000 m²/g to about 30000 m²/g, wherein an amount of the high strength fiber is about 0.5% to about 3% based on a weight of the main component, wherein the high strength fiber has a modulus of greater than about 200 g/denier, and the high strength fiber is a carbon fiber.

2. The sealant composition according to claim 1, wherein the carbon fiber has an active group on its surface.

3. The sealant composition according to claim 1, wherein the specific surface area of the high strength fiber is from about 8000 m²/g to about 13500 m²/g.

4. The sealant composition according to claim 2, wherein the carbon fiber is manufactured by an electrochemical oxidation method or a chemical grafting modification method.

5. The sealant composition according to claim 4, wherein the electrochemical oxidation method comprises: performing electrolysis in an electrolyte solution by using the carbon fiber as an anode and using nickel or copper plate as a cathode, wherein the electrolyte solution is an organic acid or a salt thereof.

6. The sealant composition according to claim 1, wherein the main component comprises about 70 wt % to about 80 wt % of polymethyl methacrylate; about 10 wt % to about 20 wt % of epoxy resin; about 5 wt % to about 15 wt % of inorganic silicon particles; and about 3 wt % to about 8 wt % of a photoinitiator.

7. The sealant composition according to claim 6, wherein the photoinitiator is one or more selected from α, α-diethoxy acetophenone, α-hydroxyl alkyl phenyl ketone, and α-amino alkyl phenyl ketone.

8. The sealant composition according to claim 1, wherein the amount of the high strength fiber is about 2% to about 2.5% based on the weight of the main component.

9. The sealant composition according to claim 1, wherein the main component comprises about 8 wt % to about 12 wt % of inorganic silicon particles.

10. A method of manufacturing a liquid crystal panel, comprising sealing a liquid crystal cell in the liquid crystal panel with the sealant composition according to claim 1.

11. A liquid crystal panel, comprising the sealant composition according to claim 1.

* * * * *